(12) United States Patent
Bregulla et al.

(10) Patent No.: US 12,111,523 B1
(45) Date of Patent: Oct. 8, 2024

(54) OPTICAL ELEMENT

(71) Applicant: SIOPTICA GMBH, Jena (DE)

(72) Inventors: Andreas Bregulla, Duderstadt (DE); André Heber, Weimar (DE); Yannick Bourgin, Ilmtal-Weinstrasse OT Ossmannstedt (DE); Markus Klippstein, Jena (DE)

(73) Assignee: SIOPTICA GMBH, Jena (DE)

( * ) Notice: Subject to any disclaimer, the term of this patent is extended or adjusted under 35 U.S.C. 154(b) by 0 days.

(21) Appl. No.: 18/293,853

(22) PCT Filed: Aug. 1, 2022

(86) PCT No.: PCT/EP2022/071547
§ 371 (c)(1),
(2) Date: May 8, 2024

(87) PCT Pub. No.: WO2023/012100
PCT Pub. Date: Feb. 9, 2023

(30) Foreign Application Priority Data

Aug. 6, 2021 (DE) .................... 10 2021 120 469.0

(51) Int. Cl.
| | | |
|---|---|---|
| G02F 1/13 | (2006.01) | |
| G02F 1/1347 | (2006.01) | |
| G02F 1/167 | (2019.01) | |
| G02F 1/1673 | (2019.01) | |
| G02F 1/1677 | (2019.01) | |

(52) U.S. Cl.
CPC ........ *G02F 1/1323* (2013.01); *G02F 1/13475* (2013.01); *G02F 1/167* (2013.01); *G02F 1/1673* (2019.01); *G02F 1/1677* (2019.01)

(58) Field of Classification Search
CPC .... G02F 1/1323; G02F 1/1673; G02F 1/1677; G02F 1/13475
See application file for complete search history.

(56) References Cited

U.S. PATENT DOCUMENTS

| | | |
|---|---|---|
| 5,956,107 A | 9/1999 | Hashimoto et al. |
| 2007/0008456 A1 | 1/2007 | Lesage et al. |
| 2007/0030240 A1 | 2/2007 | Sumiyoshi et al. |

(Continued)

FOREIGN PATENT DOCUMENTS

| | | |
|---|---|---|
| CN | 1987606 A | 6/2007 |
| CN | 101097343 A | 1/2008 |

(Continued)

*Primary Examiner* — Lucy P Chien
(74) *Attorney, Agent, or Firm* — Christensen, Fonder, Dardi & Herbert PLLC (57) ABSTRACT

An optical element including: a substrate with first and second large surfaces and a second; a plurality of opaque surfaces near or on the first large surface; in a first alternative, a plurality of surfaces near or on the second large surface which are switchable between an opaque state and a transparent state, or, in a second alternative, a plurality of chambers in the substrate which are filled with a fluid, wherein the fluid contains up to 30 volume percent of electrophoretically movable particles which absorb light and can be localized in two different states in the chambers by a variable electromagnetic field so that, in a first state the optical element limits the propagation directions of light which impinges on the light entry surface and in a second state, the optical element does not limit the propagation directions of light impinging on the light entry surface.

19 Claims, 4 Drawing Sheets

(56) References Cited

U.S. PATENT DOCUMENTS

| | | |
|---|---|---|
| 2008/0002110 A1 | 1/2008 | Choi |
| 2017/0069236 A1 | 3/2017 | Klippstein et al. |
| 2018/0267344 A1 | 9/2018 | Wu |
| 2019/0162990 A1 | 5/2019 | Nishimura et al. |
| 2020/0012129 A1 | 1/2020 | Wu |

FOREIGN PATENT DOCUMENTS

| | | |
|---|---|---|
| CN | 107734118 A | 2/2018 |
| CN | 109946889 A | 6/2019 |
| DE | 10 2015 015 516 A1 | 6/2017 |
| DE | 10 2019 006 022 B3 | 7/2020 |
| DE | 10 2019 218 286 A1 | 5/2021 |
| DE | 10 2020 002 797 B3 | 7/2021 |
| JP | 5924561 B2 | 4/2016 |
| WO | WO 2013/049088 A1 | 4/2013 |
| WO | WO 2015/121398 A1 | 8/2015 |
| WO | WO 2021/032735 A1 | 2/2021 |

OPTICAL ELEMENT

PRIORITY CLAIM

The present application is a National Phase entry of PCT Application No. PCT/EP2022/071547, filed Aug. 1, 2022, which claims priority from German Patent Application No. 10 2021 120 469.0, filed Aug. 6, 2021, the disclosures of which are hereby incorporated by reference herein in their entirety.

FIELD OF THE INVENTION

Great advances have been achieved in recent years for widening the visual angle in LCDs. However, there are often situations in which this very large viewing area of a display screen can be disadvantageous. Increasingly, information such as bank data or other personal information and sensitive data are also available on mobile devices, such as notebooks and tablets. Accordingly, there is a need to supervise viewing access for these sensitive data. It must be possible to choose between a wide viewing angle for sharing information with others on a display, e.g., when viewing vacation photographs or for advertising purposes and, on the other hand, a small viewing angle when it is desirable to treat the displayed information confidentially.

A similar problem arises in the automotive industry. In this case, the driver must not be distracted by image contents, e.g., digital entertainment programs, while the engine is running, whereas the front seat passenger may want to enjoy such image contents during the drive. Consequently, there is a need for a display screen which can switch between the corresponding display modes.

BACKGROUND OF THE INVENTION

Add-on films based on microlouvers have already been used for mobile displays in order to protect the privacy of data viewable on the display. However, these films were not switchable; they always had to be manually applied first and then removed again subsequently. They also had to be carried separately from the display when not in use at a particular time. A further substantial drawback in the use of such louvered films relates to the light losses entailed.

U.S. Pat. No. 5,956,107 A discloses a switchable light source with which a display screen can be operated in a plurality of modes. The disadvantage herein consists in that all of the outcoupling of light is based on scattering and therefore only low efficiency and sub-optimal light direction effects are achieved. In particular, the achievement of a focused light cone is not disclosed more fully.

CN 107734118 A describes a display screen which controllably configures the viewing angle of a display screen by means of two backlights. The upper backlight of the two backlights is supposed to emit focused light for this purpose. In particular, a grating with opaque and transparent portions is mentioned as configuration. However, as a result of this same grating, the light of the second backlight which must penetrate the first backlight in direction of an LCD panel is presumably also focused and, consequently, the public viewing mode which is actually provided for a wide viewing angle suffers from an appreciably reduced angle.

US 2007/030240 A1 describes an optical element for controlling the light propagation direction of light coming from a backlight. This optical element requires, for example, liquid crystals in the form of PDLCs, which are expensive on the one hand but safety-critical on the other hand particularly for end consumer applications, since switching of PDLC liquid crystals generally requires voltages higher than 60V.

CN 1987606 A describes a display screen which, again, controllably configures the viewing angle of a display screen by means of two backlights. In particular, a "first light plate" is used which must be wedge-shaped in order to permit the intended focused outcoupling of light. Exact details about achieving the focused outcoupling of light with corresponding angular conditions are not disclosed.

Further, US 2018/0267344 A1 describes a construction with two flat illumination modules. In this case, the light of the illumination module located in the rear with reference to viewing direction is focused through a separate structure. After focusing, the light must still pass the front illumination module which has scattering elements. Therefore, a strong focusing of light cannot be realized in an optimal manner for a protected view.

Finally, US 2007/0008456 A1 discloses splitting a light emission angle into at least three ranges, light being applied generally to two of these ranges. As a result of this, a protected view in which a display illuminated in this manner is used cannot be viewable solely from one direction.

WO 2015/121398 A1 by the present applicant describes a display screen of the type described above. In this case, essentially scattering particles are present in the volume of the corresponding light guide for toggling between operating modes. However, the scattering particles selected therein, which comprise a polymerizate, generally have the disadvantage that light is coupled out of both large areas so that about one half of the useful light is emitted in the wrong direction, namely, toward the backlight, and cannot be recycled there to a sufficient extent because of the construction. Beyond this, the scattering particles of polymerizate which are distributed in the volume of the light guide can lead to scattering effects under certain circumstances, particularly at higher concentrations, and these scattering effects reduce the protected view effect in the private operating mode.

US2020/012129 A1 discloses an illumination device and a display screen which describe two lights for switching between a narrow viewing mode and a wide viewing mode. On the one hand, one of the light guides is formed with fibers. On the other hand, the scattering outcoupling structure of a light guide is limited to determined strips in projection direction. This is disadvantageous for a homogeneous image illumination and generally also causes unwanted moiré effects in the construction, such as in the interplay with the pixel columns or pixel lines of an LCD panel located above the latter.

The methods and arrangements cited above generally share the disadvantage that they appreciably reduce the brightness of the basic display screen and/or require an active—or at least a special-optical element for mode switching and/or a complicated and expensive production and/or reduce the resolution in the freely viewable mode.

SUMMARY OF THE INVENTION

Therefore, it is the object of the invention to describe an optical element which can influence the transmission in an angle-dependent manner and which can switch between at least two states. The optical element should be realizable at a low cost and universally usable, particularly with various types of display screen, to enable switching between a private viewing mode and a public viewing mode. Further, display screens and illumination devices for display screens based on the optical element should be described.

The above-stated object is met according to the invention by an optical element comprising (i) a substantially plate-shaped or shell-shaped substrate S with a first large surface and a second large surface, one of the large surfaces acting as light entry surface for light incident on the optical element and the other large surface acting as light exit surface for light incident on the optical element, (ii) a plurality of opaque surfaces $O1, O2, \ldots$ near or on the first large surface, (iii) in a first alternative, a plurality of surfaces $S1, S2, \ldots$ near or on the second large surface which are switchable between an opaque state and a transparent state or, in a second alternative, a plurality of chambers $K1, K2, \ldots$ in the substrate S which are filled with a fluid F, which fluid F contains up to 30 volume percent, preferably up to 20 volume percent, of electrophoretically or magnetophoretically movable particles P which absorb light of one or more wavelengths or wavelength ranges and which can be localized in at least two different states inside of the respective chambers $K1, K2, \ldots$ by a variable electromagnetic field, (iv) so that, in a first state in which, in the first alternative, the switchable surfaces $S1, S2, \ldots$ are in the opaque state and in which, in the second alternative, more than one half of all of the particles P, particularly preferably more than 90% of all of the particles P, are located in that half, preferably in that one third, of the corresponding chambers $K1, K2, \ldots$ that is remote of the first large surface, the optical element limits the propagation directions of light which impinges on the light entry surface, (v) and so that, in a second state in which, in the first alternative, the switchable surfaces $S1, S2, \ldots$ are in the transparent state and in which, in the second alternative, more than one half of all of the particles P, particularly preferably more than 90% of all of the particles P, are located in that half of the corresponding chambers $K1, K2, \ldots$ that faces the first large surface, the optical element does not limit the propagation directions of light impinging on the light entry surface but, rather, merely does not transmit a portion of the light because of the opaque surfaces $O1, O2, \ldots$.

In this regard, "near" in relation to the opaque surfaces $O1, O2, \ldots$ and the switchable surfaces $S1, S2, \ldots$ means that the distance of these surfaces from the respective large surface is not greater than the thickness of the substrate S. In this regard, it is contemplated to arrange the opaque surfaces $O1, O2, \ldots$ and/or the switchable surfaces $S1, S2, \ldots$ inside of or outside of the substrate S.

It is preferable that the angle-dependent transmission is more than 30%, preferably more than 50%, in the second state and is less than 5%, preferably less than 3%, particularly preferably less than 2%, in the first state in an angular range of more than 30° (this angle may also be varied, e.g., 10°, 20°, 25°, 40° or) 45° with respect to a surface normal of the second large surface of the substrate S and measured in a selectable direction perpendicular to a longitudinal extent of the substrate S, preferably measured in horizontal direction. Accordingly, in the first state—with the exception of a small residual portion—the propagation directions of the light penetrating the optical element are appreciably limited.

Depending on the case of application, the first large surface of the substrate S can be the front or rear large surface from viewing direction.

The (permanently) opaque surfaces $O1, O2, \ldots$ are preferably strip-shaped. However, it is also possible that the opaque surfaces $O1, O2, \ldots$ are distributed from one another over the (or near the) entire first large surface in a two-dimensional pattern which may be periodic or non-periodic. An exemplary possible two-dimensional pattern of this kind could perhaps comprise two opaque grids, e.g., intersecting at 90° angles, i.e., rectangular or square non-opaque partial surfaces are surrounded on all four sides by opaque surfaces $O1, O2, \ldots$.

In a corresponding manner, also in the first alternative, the switchable surfaces $S1, S2, \ldots$ are strip-shaped when the opaque surfaces $O1, O2, \ldots$ are strip-shaped. Otherwise, the switchable surfaces $S1, S2, \ldots$ have shapes similar to or equivalent to the opaque surfaces $O1, O2, \ldots$.

Further, in the first alternative, in the first state of the optical element, there is generally a maximum transmission in that direction or those directions parallel to the (imaginary) connecting lines connecting the centers of the respective intermediate surface between every two switchable surfaces $S1, S2, \ldots$ and the respective center of the intermediate surface between the nearest (permanently) opaque surfaces $O1, O2, \ldots$. The switchable surfaces $S1, S2, \ldots$ are preferably located in front of the opaque surfaces $O1, O2, \ldots$ from direction of a viewer. Accordingly, every two opaque surfaces $O1, O2, \ldots$ and every two switchable surfaces $S1, S2, \ldots$ are separated by transparent intermediate surfaces. The nearest to a switchable surface is that opaque surface with the shortest distance from the respective switchable surface. The same is true for the intermediate surfaces.

In the simplest case, the switchable surfaces $S1, S2, \ldots$ and the opaque surfaces $O1, O2, \ldots$ correspond to one another in size and position so that they are congruent in a projection along a direction perpendicular to the large surfaces. In this case, the maximum of the transmission lies in direction perpendicular to the large surfaces, since the connecting lines of the respective intermediate surfaces also extend perpendicular to the large surfaces. In the case of shell-shaped substrates, a focusing of the directions of the maximum transmission on a viewer can be carried out in this way.

However, it is also possible to arrange the switchable surfaces $S1, S2, \ldots$ and the opaque surfaces $O1, O2, \ldots$ to be offset to one another with respect to the projection along the direction perpendicular to the large surfaces, possibly also with different sizes so that the connecting lines of the centers of the respective intermediate surfaces form angles different than 90° with the large surfaces or form angles different than 0° with the normals thereof-possibly dependent upon location as in the case of shell-shaped substrates. This is especially useful with plate-shaped substrates. If all of the connecting lines of the respective intermediate surfaces form an equal angle different than 90° with the large surfaces, the transmission maximum for a notional viewer is displaced with respect to a position in which the viewer views the substrate along the connecting lines, i.e., at an oblique angle different than 90°. Of advantage particularly in the case of plate-shaped substrates is a configuration in which the switchable surfaces $S1, S2, \ldots$ and the opaque surfaces $O1, O2, \ldots$ are arranged in such a way that all of the connecting lines form different angles with the large surfaces, i.e., different angles in pairs, where the connecting lines particularly preferably intersect at a point. A notional viewer located at this intersection point then perceives a maximum transmission only at this intersection point and in a very confined area around this intersection point; when the viewing position shifts away from the intersection point, there is a steep drop in transmission, for example, with an intensity distribution that corresponds to a top hat distribution.

The preceding remarks concerning the ratio of opaque surfaces O1, O2, ... to switchable surfaces S1, S2, ... can also be applied in an analogous manner to the ratio of chambers K1, K2, ... to switchable surfaces S1, S2, .... Here, also, the switchable surfaces S1, S2, ... are located in front of the chambers K1, K2, ... and connecting lines can be constructed for the respective transparent intermediate surfaces.

It is further possible that, in the first alternative, the switchable surfaces S1, S2, ... contain at least one electrochromic layer, an LC cell, an electrowetting cell and/or an LC film with dichroic dyes, e.g., in the form of black PDLC films. Other variants are contemplated and lie within the scope of the invention.

As an alternative to this, it is possible that, in the first alternative, the switchable surfaces S1, S2, ... comprise fluid chambers R which contain, in each instance, a fluid F, which fluid F contains up to 30 volume percent, preferably up to 20 volume percent, of electrophoretically or magnetophoretically movable particles P which absorb light of one or more wavelengths or wavelength ranges and, further, electromagnetic switching means are formed. The electromagnetic switching means are formed in a planar manner at one or more sides of the fluid chambers R and generate an electromagnetic field acting in the fluid chambers R in a switched on condition, by means of which the particles P are moved in the fluid such that the position and/or orientation of the particles are/is switchable between at least the two aforementioned states which generate the aforementioned opaque and transparent states of the switchable surfaces S1, S2, .... In the case of the first state, the particles P are preferably distributed as far as possible over the entire surface of the switchable surfaces S1, S2, ..., while, in the second state, the particles are conglomerated in the smallest possible volume so as not to cover an area of the switchable surfaces S1, S2, ... which has the largest possible surface area.

The one or more wavelengths or wavelength ranges in which the electrophoretically or magnetophoretically movable particles absorb light preferably lie in the visible spectrum and particularly preferably substantially completely cover the visible spectrum. However, for specific purposes, they can also be lie outside of the visible spectrum such as when UV light or IR light is to be influenced, e.g., for metrological purposes.

The electromagnetic switching means which are formed in a planar manner at one or more sides of the fluid chambers R in the substrate S are arranged, for example, at the narrow sides or at large surfaces of the respective fluid chambers R.

The particles P are, for example, nanoparticles, quantum dots and/or dyes. They have a spatial extent of at most 200 nm, preferably at most 100 nm, particularly preferably at most 50 nm. By "spatial extent" is meant herein the maximum extent in three-dimensional space or the hydrodynamic radius, whichever is greater. Accordingly, this means the diameter in the case of spherical particles. With cord-shaped particles P, it is the greatest possible distance between two points on the surface of the particles.

In another advantageous configuration, a plurality of types of particles P which differ with respect to their absorption properties and/or their transport characteristics in the electromagnetic field are present in the liquid. By "transport characteristics" is meant in particular the behavior of the particles P during the respective phoresis (transport in the field).

This variant comes to the fore particularly in case of nanoparticles: the difference in the types of particles consists, e.g., in the particle size and/or the surface function, i.e., the zeta potential.

In case quantum dots or dyes are used as particles P and if the latter are fluorescent, a quencher material is preferably used in order to prevent precisely this florescence.

The fluid F can be polar or non-polar. Further, it can comprise, for example, water, oil, toluene or formaldehyde, also mixed with a 10 volume-percent ferrofluid and/or electrolytes.

Further, either the particles P are electrically charged and the electromagnetic switching means are formed as electrodes for generating a static or dynamic electric field, or the particles P are magnetic and electromagnetic switching means are formed as electromagnetic layers for generating a static or dynamic magnetic field so that the electromagnetic particles P move in the electric field or magnetic field in the fluid F. The corresponding electric field lines would then be formed parallel, for example, in the center of a fluid chamber R and would more likely exhibit deviations from parallelism at the edge. However, other configurations are also possible. Accordingly, leading physical effects for the movement of the particles P when an electromagnetic field, particularly a static field, is applied are (di) electrophoresis or magnetophoresis.

For example, in a plane parallel to the main propagation direction of the substrate S, the fluid chambers R can be between 2-μm and 50-μm wide (distance from long side to long side of a fluid chamber) and at a distance from one another of a minimum of 10 μm and approximately 150 μm, respectively (distance from long side to next-adjacent long side of the next-adjacent fluid chamber). The depth of a fluid chamber R can amount to from several micrometers to approximately 50 μm. However, values other than those described herein are explicitly possible.

Further, the switchable surfaces S1, S2, ... can be divided into at least two groups which are switchable independently from one another in each instance such that a local switchability between the first state and the second state is possible on the optical element.

In the first alternative of the configuration of the optical element, this optical element can further comprise means for suppressing light rays propagating in the substrate S which either penetrate into the substrate S from an intermediate space between two adjacent opaque surfaces O1, O2, ... or, in the opaque transparent state of the switchable surfaces S1, S2, ..., from an intermediate space between two adjacent switchable surfaces S1, S2, ... and are directed to the respective intermediate spaces which are not the next-adjacent intermediate spaces between correspondingly switchable surfaces S3, S4 or opaque surfaces O3, O4 on the respective opposite large surface of the substrate S. The aforementioned means can be formed, for example, in that, based on a suitable choice of the refractive index of the substrate S compared with the refractive index of the medium surrounding the substrate S, it is not possible for particular light rays to exit the substrate S at determinable angles because of total internal reflection.

Alternatively, the aforementioned means could be formed in each instance in that absorbers are inserted in the substrate S between some or all of the opaque surfaces O1, O2, ..., which absorbers extend substantially in each instance from the first large surface of the substrate S to the second large surface of the substrate S and are oriented approximately perpendicular to one of the large surfaces. Further, the aforementioned means could be implemented by suitable selection of the thickness of the opaque surfaces O1, O2, . . . and/or of the switchable surfaces S1, S2, . . . . A plurality of the above-mentioned measures for implementing the aforementioned means can also be combined.

In order to better distinguish between the first alternative and second alternative, the chambers K1, K2, . . . filled with a fluid F in the second alternative are referred to as "chambers" although they in fact likewise correspond to fluid chambers.

In the second alternative of the optical element, it is preferable that a chamber K1, K2, . . . lies in each instance above an opaque surface O1, O2, . . . in projection direction perpendicular to the substrate S. Further, it is advantageous when, in the second alternative, electromagnetic switching means are formed, which electromagnetic switching means are formed in a planar manner at one or more sides of the chambers K1, K2, . . . and generate an electromagnetic field acting in the chambers K1, K2, . . . in a switched on state, by means of which the particles P are moved in the fluid so that the position and/or orientation of the particles P are/is switchable between at least two states which produce the aforementioned at least two states of the optical element. The aforementioned electromagnetic switching means are preferably electrodes, and at least the electrodes at the second large surface are (at least partially) transparent. The electrodes at the first large surface are arranged at or near the opaque surfaces O1, O2, . . . or can even correspond to the latter in case of opaque electrodes.

As regards the dimensions of the chambers K1, K2, . . . in the second alternative, reference is made to the configuration variants of the fluid chambers given above for the first alternative of the optical element. However, particularly the depth of such a chamber K1, K2, . . . can also be greater than 50 μm, for example, 100 μm.

The general remarks respecting fluid F and particles P which have been made with respect to the first alternative are also applicable in an analogous manner to the second alternative and will therefore not be repeated. A substantial difference between the configurations according to the first alternative and according to the second alternative consists in that, in the first alternative, the particles P switch the respective switchable surfaces S1, S2, . . . to be opaque over the surface in one state and to be transparent as possible in the other state, i.e., the particles P are moved more in the horizontal, whereas, in the second alternative, the particles P are moved between the two states more in the vertical in order to achieve or prevent the desired influencing of the light propagation directions through interaction with the opaque surfaces O1, O2, . . . .

In the first state, it is the case for the optical element in the second alternative that at least four fifths, particularly preferably more than nine tenths, of all of the particles P are located in that one third, preferably in that one fourth, of the corresponding chambers K1, K2, . . . that are located closest to the second large surface of the substrate S.

Further, the chambers K1, K2, . . . can be divided into at least two groups which are switchable independently from one another in each instance so that a local switchability between the first state and the second state is enabled on the optical element.

A particularly advantageous configuration of the optical element in the second alternative consists in that the intermediate spaces in the substrate S between respective next-adjacent chambers K1, K2, . . . have a higher refractive index than the fluid F in the chambers K1, K2, . . . at least for a wavelength in the visible range, but preferably for all wavelengths in the range of from 400 nm to 800 nm, inclusive. The aforementioned difference in refractive indices can amount to 0.01 or 0.02 or 0.03 or more, for example.

In this way, it is brought about that, because of the opaque surfaces O1, O2, . . . , light impinging, for example, on the optical element at the first large surface is incident in the optical element exclusively through the surface portions of the first large surface between the opaque surfaces O1, O2, . . . and, depending on the direction of incidence, polarization and above-mentioned difference in refractive index a) between two chambers K1, K2, . . . , is totally internally reflected at that location and is then coupled out again at the upper surface (namely, in this case, at the second large surface) of the corresponding region of the substrate S (case a), or b) overcomes the refractive index boundary from the substrate material to the fluid F and is incident in the adjoining chamber with fluid F, propagates therein and is finally absorbed at the upper side thereof because of the particles P in the first state or is coupled out in the second state (case b), or c) after overcoming the refractive index boundary from the substrate material to the fluid F, again overcomes the next refractive index boundary from the fluid F to the next-adjacent substrate material and, depending on the then resulting propagation direction and polarization, is coupled out or propagates further in the first optical element until being either coupled out or absorbed depending on the state of the optical element (case c), or d) in both states, traverses the substrate S between two chambers K1, K2, . . . without total internal reflection and is coupled out of the optical element again at the second large surface (case d). This description applies in an analogous manner for the case where light impinges on the optical element via the second large surface. Of course, the light path is reversible.

The aforementioned difference in refractive index having the effect described above can also be applied in principle for the first alternative of the optical element. In this case, those regions located in each instance in the substrate between an opaque surface O1, O2, . . . and the switchable surface S1, S2, . . . most closely adjacent to the latter have a lower refractive index than the complementary regions. Accordingly, instead of chambers K1, K2, . . . , those volume regions of the substrate S located in each instance between an opaque surface O1, . . . and the respective closest switchable surface S1, . . . have a lower refractive index than the volume regions of the substrate S surrounding them. By "closest" is meant herein along a surface normal-only defined locally in the case of shell-shaped substrates-of the first large surface in direction of the second large surface. Accordingly, cases a) to d) or selections thereof can also be produced in principle. Here, also, this applies at least for a wavelength in the visible range, but preferably for all wavelengths in the range of from 400 nm to 800 nm.

The advantage of this configuration consists in that the light which is limited in the first state with respect to its propagation directions through the optical element approximately has a top hat distribution, i.e., the luminance has only a slight angle dependence around the preferred propagation direction after which there is a steep drop in transmission. The transmission dependence described above has the advantage that a viewer perceives the transmission homogeneously from a preferential direction and the transmission is sharply reduced for viewers from angles of, e.g., more than 30° (this angle may also be varied, e.g., 10°, 20°, 25°, 40° or) 45°. In a particular configuration of the optical element according to the invention in the second alternative, the refractive index of the material of the substrate (at least between two adjacent chambers K1, K2, . . . ) and/or the refractive index of the fluid F in the chambers K1, K2, . . .

are/is switchable between at least two states so that the differences in the refractive index can be modulated in each instance at the corresponding refractive index boundaries, as a result of which the aforementioned limiting or influencing of the propagation directions is variable.

Advantageous configurations are further generated in such a way that every opaque surface O1, O2, . . . is formed by a permanent absorber layer and/or by at least one downwardly reflecting layer. If there is only one reflective layer, which is possible within the scope of the invention, it goes without saying that this reflective layer likewise has opaque characteristics. The reflective characteristics contribute to increased efficiency, for example, when an optical element according to the invention is installed in an illumination device, for example, for an LCD panel.

The optical element can advantageously be combined with a polarizer which polarizes the transmitted light linearly parallel to the preferred private viewing direction.

In both alternatives of the optical element, it is possible that the substrate S forms the cover substrate of an OLED, microLED or LCD panel which each possesses pixels or subpixels. Alternatively, the substrate S can be applied to or positioned in front of the above-mentioned cover substrate.

Advantageously, it is the case for the first alternative that the center of each region is situated in each instance between switchable surfaces S1, S2, . . . and/or opaque surfaces O1, O2, . . . in front of the center point of an aforementioned pixel or subpixel of the respective panel in perpendicular projection on the substrate S with a tolerance of at most 20% of the width of such a region.

Alternatively, however, it is also possible that the center of each region is situated between switchable surfaces S1, S2, . . . and/or opaque surfaces O1, O2, . . . so as to be slightly offset in each instance in front of the center point of an aforementioned pixel or subpixel of the respective panel in perpendicular projection on the substrate S such that the imaginary connecting lines connecting the respective centers of the switchable surfaces S1, S2, . . . with those of opaque surfaces O1, O2, . . . point towards a viewer with a tolerance of at most 15°. Accordingly, the light transmitted in the first state of the optical element would be focused toward a viewer.

Variations in the sizes of the switchable surfaces S1, S2, . . . and/or of the opaque surfaces O1, O2, . . . are also possible in order to further adjust the transmission characteristics of the optical element.

In this sense, in the second alternative, for example, the upper surfaces of the chambers may be smaller than the lower surfaces of the chambers which generally correspond to the opaque surfaces O1, O2, . . . . Accordingly, the transmission can be focused toward the viewer.

It is further possible in both alternatives of the optical element that the opaque surfaces O1, O2, . . . are arranged at or near the large surface behind the substrate S in viewing direction of a viewer and are reflective or partially reflective at the side thereof facing away from the viewer.

Another part of the object of the invention is met according to the invention by an illumination device for a display screen which can be operated for a restricted viewing mode in a first state and for a public viewing mode in a second state, comprising a two-dimensionally extensive backlight which emits light in an unrestricted angular range and an optical element situated in front of the backlight in viewing direction as has been described.

The backlight used herein preferably emits light in an unrestricted angular range. However it is also possible that the backlight has a certain pre-focus, for example, in that it emits no more than 10% or 20% of the peak brightness horizontally in a (horizontally measured) angular range over 30° or 45°.

Such an illumination device is advantageously used with a transmissive image rendering unit arranged in front of the optical element in viewing direction in order to obtain a display screen which can be operated for a restricted viewing mode in a first state and for a private viewing mode in a second state because, due to the optical element, the light of the illumination device is limited with respect to propagation directions, that is, consequently, focused (first state) in one case and not focused (second state) in the other case.

The final part of the object of the invention is met according to the invention by a display screen which can be operated in a first state for a restricted viewing mode and in a second state for a public viewing mode, comprising an optical element described above and an image rendering unit arranged upstream or downstream of the optical element from the viewpoint of a viewer.

The image rendering unit is, for example, an OLED display, an LCD, an SED, an FED, a microLED display or a VFD. Since the optical element is operative regardless of the type of image rendering unit, any other type of display screen is likewise contemplated.

In a particularly advantageous manner, the illumination device according to the invention with a display screen and the display screen according to the invention are used in a vehicle for selectively displaying image contents only for the front seat passenger in the first state or for both driver and passenger simultaneously in the second state. The former case is helpful, for example, when the passenger is watching entertainment programming which could distract the driver.

The invention can likewise be used to input or display confidential data, for example, PIN numbers, e-mails, SMSes or passwords, in automatic tellers, payment terminals or mobile devices.

Further, the selected limited propagation directions for the first state for a restricted view can be defined and implemented independent from one another for horizontal direction and for vertical direction. For example, an angle which is larger in vertical direction than in horizontal direction (or possibly no limitation at all) could be practical, such as when persons of different sizes are to view an image at automatic teller machines, while viewing from the side should remain largely or completely restricted. For POS payment terminals, on the other hand, safety rules often dictate viewing restrictions in the first state in both horizontal direction and vertical direction.

The performance of the invention remains consistent in principle when the above-described parameters are varied within certain limits.

It will be understood that the features mentioned above and those yet to be explained below may be used not only in the stated combinations but also in other combinations or alone without departing from the scope of the present invention.

BRIEF DESCRIPTION OF THE DRAWINGS

The invention will be explained in more detail in the following with reference to drawings which also disclose key features of the invention. These embodiment examples are provided merely to be illustrative and should not be considered as limiting. For example, a description of an embodiment example having a plurality of elements or components should not be interpreted to mean that all of these elements or components are necessary for its implementation. On the contrary, other embodiment examples may also contain alternative elements and components, fewer elements or components, or additional elements or components. Elements or components of different embodiment examples can be combined with one another unless otherwise stated. Modifications and alterations which are described for one of the embodiment examples may also be applicable to other embodiment examples. Like or comparable elements in the various figures are designated by the same reference numerals and not mentioned repeatedly so as to prevent repetition. The drawings show.

The drawings are not to scale and are merely schematic depictions.

DETAILED DESCRIPTION OF THE DRAWINGS

Figure 1A:
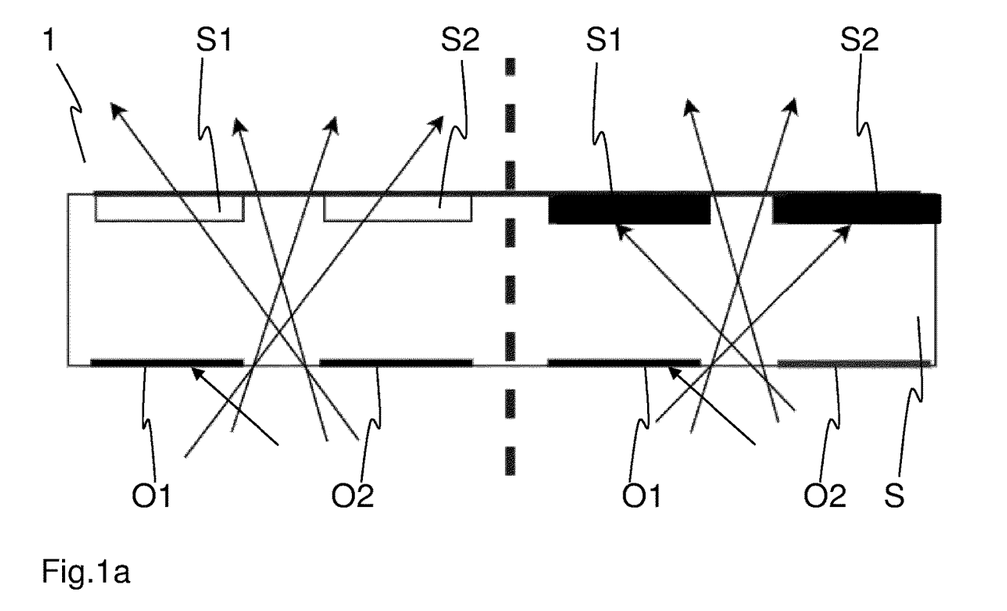
FIG. 1a a schematic diagram of a first configuration of an optical element in a first alternative.

FIG. 1a is a schematic diagram showing the first alternative of a first embodiment of an optical element 1.

The second state of an exemplary optical element 1 is shown to the left of the dashed vertical line and the first state of the exemplary optical element 1 is shown to the right of the dashed vertical line. This optical element 1 comprises (i) a substantially plate-shaped substrate S with a first large surface (bottom) and a second large surface (top), the first large surfaces acting in the present case as light entry surface for light incident on the optical element and the other large surface acting as light exit surface for light incident on the optical element, (ii) a plurality of (permanently) opaque surfaces O1, O2, . . . near or on the first large surface, (iii) in a first alternative, a plurality of surfaces S1, S2, . . . near or on the second large surface which are switchable between an opaque state and a transparent state, (iv) so that, in a first state in which, in the first alternative, the switchable surfaces S1, S2, . . . are in the opaque state, the optical element 1 limits the propagation directions of light which impinges on the light entry surface, (v) and so that, in a second state in which, in the first alternative, the switchable surfaces S1, S2, . . . are in the transparent state, the optical element 1 does not limit the propagation directions of light impinging on the light entry surface but, rather, merely does not transmit a portion of the light because of the opaque surfaces O1, O2, . . . .

In the first state, the aforementioned limiting of the propagation directions is achieved, as illustrated on the right-hand side of the diagram in FIG. 1, through the interaction of the switchable surfaces S1, S2, . . . , which are switched to opaque in the first state, and the permanently opaque surfaces O1, O2, . . . . Sufficiently oblique light rays which pass the intermediate spaces between opaque surfaces O1, O2, . . . and penetrate into the substrate S are absorbed by the switchable surfaces S1, S2, . . . switched to be opaque. Light rays which, by contrast, propagate inside of a limited angular range pass the transparent intermediate spaces between the opaque surfaces O1, O2, . . . so that light penetrating through the optical element 1 is limited with respect to its propagation directions. The shape and arrangement of the respective permanently opaque surfaces O1, O2, . . . and of the switchable surfaces S1, S2, . . . and further parameters such as the refractive index of the transparent substrate S and the thickness thereof determine the extent to which the limiting of the propagation directions takes place, in particular, the angles and the directions in which the light is transmitted and whether the aforementioned limiting of the propagation directions takes place only in one plane (e.g., horizontally) or in a plurality of planes (e.g., horizontally and vertically).

Further, in the first alternative, in the first state of the optical element 1, there is generally a maximum transmission in that direction or in those directions which are parallel to the (imaginary) connecting lines of the centers of the respective intermediate surface between every two switchable surfaces S1, S2, . . . and the respective center of the intermediate surface between the nearest (permanently) opaque surfaces O1, O2, . . . .

In the second state, when the switchable surfaces S1, S2, . . . are switched to transparent, basically all of the light rays which penetrate into the substrate S between permanently opaque surfaces O1, O2, . . . can also exit again from the substrate S at the second large surface of the substrate S. In so doing, there is no limiting of the propagation directions. Only the light rays which impinge on the permanently opaque surfaces O1, O2, . . . from below and are not transmitted cannot exit from the second large surface of the substrate S. However, it is also possible that the permanently opaque surfaces O1, O2, . . . are reflective from below so that light incident thereon is reflected and can possibly be recycled, such as when a backlight, e.g., with a light guide, is located below it.

Figure 5:
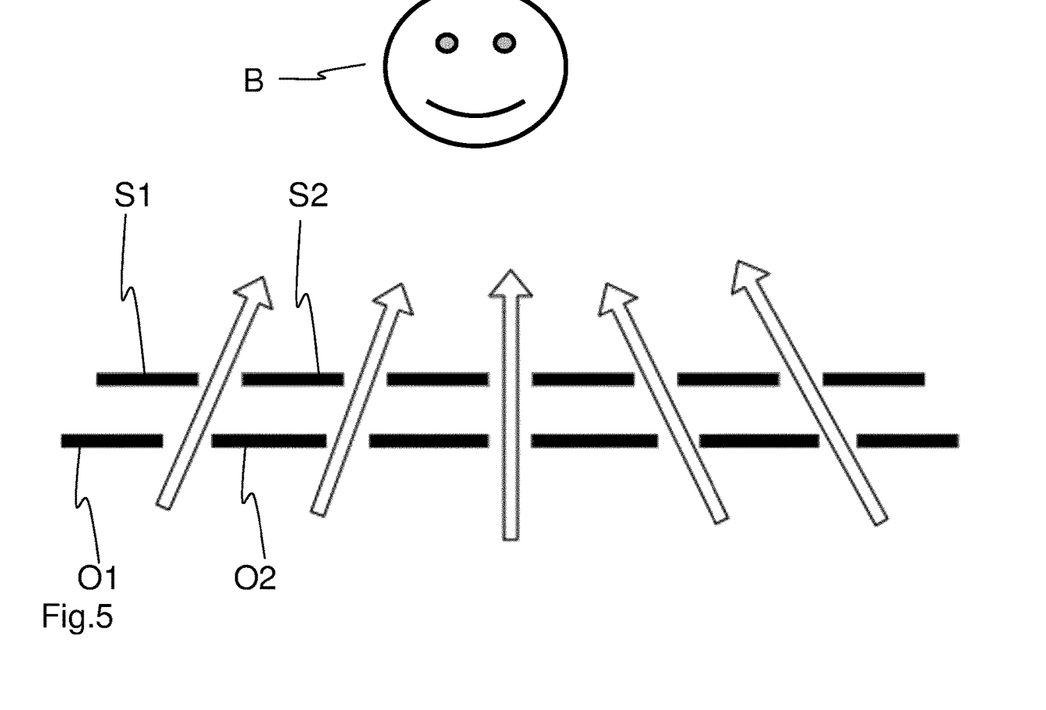
FIG. 5 a schematic diagram illustrating the variation of the positioning of switchable surfaces relative to opaque surfaces in the first alternative of an optical element.

The light path through the optical element 1 is shown schematically in FIG. 1a (as well as in the following drawings up to and including FIG. 5) by the light rays which are incident from below. Only a few selected possible light rays are shown, whereas, in reality, there is a great number of light rays.

The angle-dependent transmission is preferably greater than 30%, preferably greater than 50%, in the second state and is less than 5%, preferably less than 3%, particularly preferably less than 2%, in the first state in an angular range of more than 30° (this angle may also be varied, e.g., 10°, 20°, 25°, 40° or) 45° with respect to a surface normal of the second large surface of the substrate S and measured in a selectable direction perpendicular to a longitudinal extent of the substrate S, preferably measured in horizontal direction. Accordingly, in the first state—with the exception of a small residual portion—the propagation directions of the light penetrating the optical element 1 are appreciably limited.

The (permanently) opaque surfaces O1, O2, . . . are preferably strip-shaped. However, it is also possible that the opaque surfaces O1, O2, . . . are distributed over (or close to) the entirety of the first large surface in a two-dimensional pattern (e.g., a grid-shaped pattern) which may be periodic or non-periodic. Correspondingly, in the first alternative, the switchable surfaces S1, S2, . . . are also strip-shaped when the opaque surfaces O1, O2, . . . are strip-shaped. Otherwise, the switchable surfaces S1, S2, . . . have shapes similar to or equivalent to those of the opaque surfaces O1, O2, . . . .

Figure 1B:
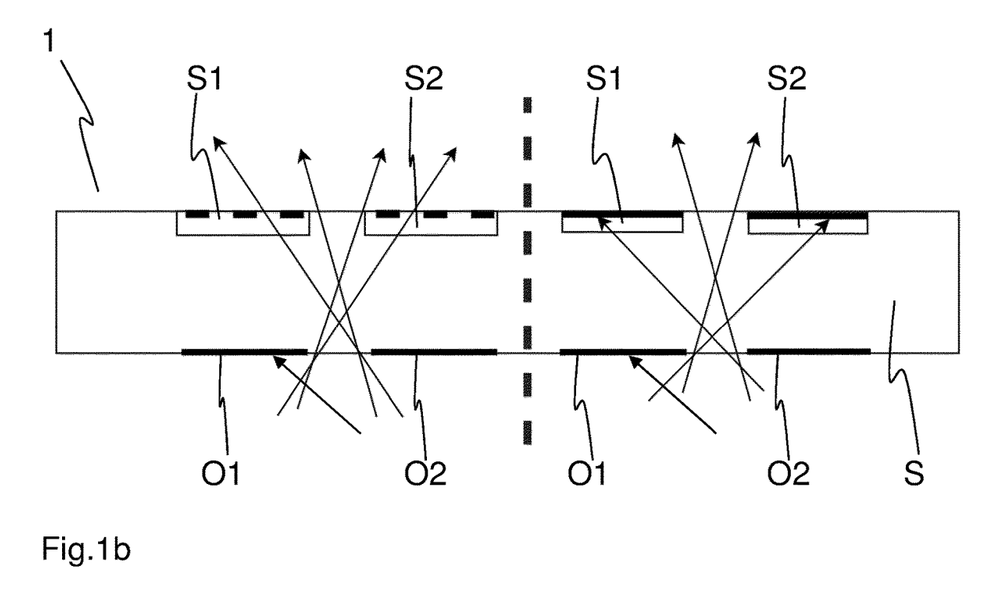
FIG. 1b a schematic diagram of a second configuration of an optical element in the first alternative.

FIG. 1*b* shows a schematic diagram illustrating a second configuration of an optical element 1 in the first alternative. This optical element 1 is realized in such a way that, in the first alternative, the switchable surfaces S1, S2, . . . comprise fluid chambers R, each of which contains a fluid F. The fluid F contains up to 30 volume percent, preferably up to 20 volume percent of electrophoretically or magnetophoretically movable particles P which absorb light of one or more wavelengths or wavelength ranges. Further, electromagnetic switching means are formed in a planar manner at one or more sides of the fluid chambers R. In a switched on state, the electromagnetic switching means generate an electromagnetic field acting in the fluid chambers R, as a result of which the particles P are moved in the fluid so that the position and/or orientation of the particles are/is switchable between at least the two aforementioned states which produce the aforementioned opaque and transparent states of the switchable surfaces S1, S2, . . . . In the case of the first state, as is illustrated on the right-hand side of FIG. 1*b*, the particles P are preferably distributed if possible over the entire surface of the switchable surfaces S1, S2, . . . , while, in the second state, the particles P are conglomerated in one or more volumes which are as small as possible, as is shown on the left-hand side of FIG. 1*b*, in order not to cover an area of the switchable surfaces S1, S2, . . . which is as large as possible.

The one or more wavelengths or wavelength ranges in which the electrophoretically or magnetophoretically movable particles P absorb light preferably lie in the visible spectrum and particularly preferably cover the latter substantially completely. However, for specific purposes, they can also lie outside of the visible spectrum such, as when UV light or IR light is to be influenced, e.g., for metrological purposes.

The electromagnetic switching means, not shown, which are formed in a planar manner at one or more sides of the fluid chambers R in the substrate S are arranged, for example, at the narrow sides or at large surfaces of the respective fluid chambers R. It is also possible, for example, to arrange these electrodes in a strip-shaped manner and, in the second state, with periodically alternating polarity at a large surface of at least one fluid chamber R, while a planar electrode which is controlled depending on the state is arranged on the opposite large surface.

The particles P are, for example, nanoparticles, quantum dots and/or dyes. They have a spatial extent of at most 200 nm, preferably at most 100 nm, particularly preferably at most 50 nm. By "spatial extent" is meant herein the maximum extent in three-dimensional space or the hydrodynamic radius, whichever is greater. Accordingly, this means the diameter in the case of spherical particles P. With cord-shaped particles, it is the greatest possible distance between two points on the surface of the particles P.

The fluid F can be polar or non-polar. Further, it can comprise, for example, water, oil, toluene or formaldehyde, also mixed with a 10 volume-percent ferrofluid and/or electrolytes. Other configurations are contemplated within the framework of the invention.

Further, either the particles P are electrically charged and the electromagnetic switching means are formed as electrodes for generating a static or dynamic electric field, or the particles P are magnetic, and electromagnetic switching means are formed as electromagnetic layers for generating a static or dynamic magnetic field so that the electromagnetic particles P move in the electric field or magnetic field in the fluid F.

For example, in a plane parallel to the main propagation direction of the substrate S, the fluid chambers R can be between 2-µm and 50-µm wide (distance from long side to long side of a fluid chamber) and at a distance from one another of a minimum of 10 µm and approximately 150 µm, respectively (distance from long side to next-adjacent long side of the next-adjacent fluid chamber). The depth of a fluid chamber R can amount to from several micrometers to approximately 50 µm. However, values other than those described herein are explicitly possible.

Further, the switchable surfaces S1, S2, . . . can be divided into at least two groups which are switchable independently from one another in each instance such that a local switchability between the first state and the second state is possible on the optical element 1.

Figure 2:
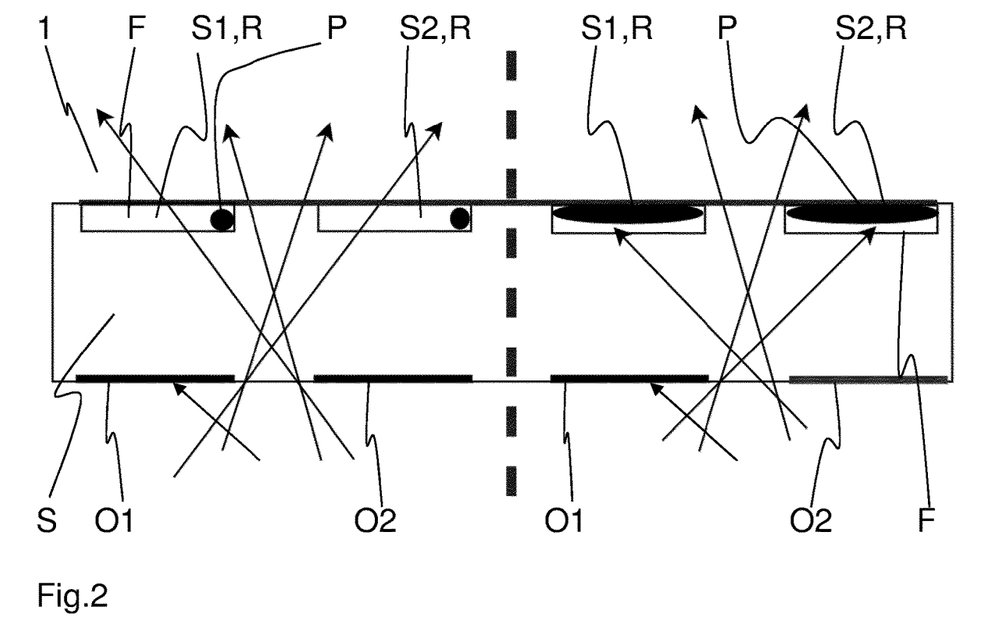
FIG. 2 a schematic diagram of a third configuration of an optical element in the first alternative.

FIG. 2 shows a schematic diagram illustrating a third configuration of an optical element 1 in the first alternative. The second state of an exemplary optical element 1 is shown to the left of the dashed vertical line and the first state of the exemplary optical element 1 is shown to the right of the dashed vertical line. Absorbent particles P are also used again here as has already been described referring to FIG. 1*b*. The key difference in this case is that the electrodes are formed in such a way that, in the second state, the particles P are concentrated only in a smallest possible volume within a fluid chamber R. This can be realized, e.g., in that electrodes are arranged at the right-hand narrow sides of the fluid chambers R and are controlled in the second state in such a way that the particles move therein.

In the first alternative of the optical element 1, this optical element 1 can further comprise means for suppressing light rays propagating in the substrate S which either penetrate into the substrate S from an intermediate space between two adjacent opaque surfaces O1, O2 or, in the opaque transparent state of the switchable surfaces S1, S2, . . . , from an intermediate space between two adjacent switchable surfaces S1, S2 and are directed to the respective intermediate spaces which are not the next-adjacent intermediate spaces between correspondingly switchable surfaces S3, S4 or opaque surfaces O3, O4 on the respective opposite large surface of the substrate S. The aforementioned means can be formed, for example, in that, based on a suitable choice of the refractive index of the substrate S compared with the refractive index of the medium surrounding the substrate, it is not possible for particular light rays to exit the substrate at determinable angles because of total internal reflection.

Alternatively, the aforementioned means could be formed in each instance in that absorbers are inserted in the substrate S between some or all of the opaque surfaces O1, O2, . . . , which absorbers extend substantially in each instance from the first large surface of the substrate S to the second large surface of the substrate S and are oriented approximately perpendicular to one of the large surfaces. Further, the aforementioned means could be implemented by suitable selection of the thickness of the opaque surfaces O1, O2, . . . and/or of the switchable surfaces S1, S2, . . . . A plurality of the above-mentioned measures for implementing the aforementioned means can also be combined.

Figure 3:
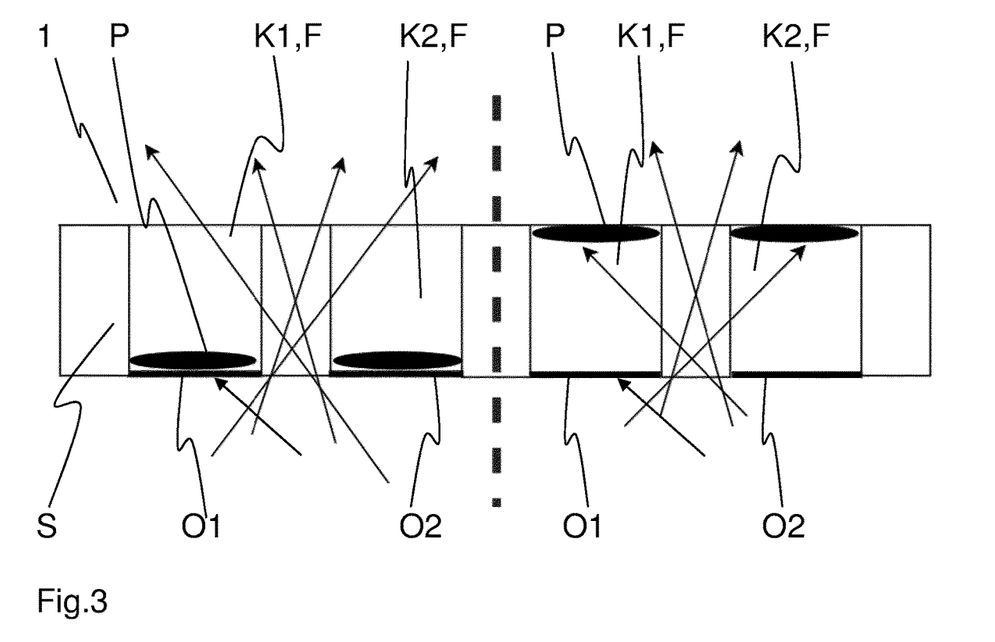
FIG. 3 a schematic diagram of a first configuration of an optical element in a second alternative.

Further, FIG. 3 shows a schematic diagram illustrating a first configuration of an optical element 1 in the second alternative. In this case, an optical element comprises (i) a substantially plate-shaped substrate S with a first large surface (bottom) and a second large surface (top), the—in this example—first large surface acting as light entry surface for light incident on the optical element and the other large surface acting as light exit surface for light incident on the optical element, (ii) a plurality of opaque surfaces O1, O2, . . . near or on the first large surface, (iii) in this second alternative, a plurality of chambers K1, K2, . . . in the substrate S which are filled with a fluid F, which fluid F contains up to 30 volume percent, preferably up to 20 volume percent, of electrophoretically or magnetophoretically movable particles P which absorb light of one or more wavelengths or wavelength ranges and which can be localized in at least two different states inside of the respective chambers K1, K2, . . . by a variable electromagnetic field, (iv) so that, in a first state in which, in this second alternative, more than one half of all of the particles P, particularly preferably more than 90% of all of the particles P, are located in that one half, preferably in that one third, of the corresponding chambers K1, K2, . . . that is remote of the first large surface, the optical element 1 limits the propagation directions of light which impinges on the light entry surface, (v) and so that, in a second state in which, in this second alternative, more than one half of all of the particles P, particularly preferably more than 90% of all of the particles P, are located in that one half of the corresponding chambers K1, K2, . . . that faces the first large surface, the optical element 1 does not limit the propagation directions of light impinging on the light entry surface but, rather, merely does not transmit a portion of the light because of the opaque surfaces O1, O2, . . . .

The remarks made above with respect to the electrophoretically or magnetophoretically movable particles P apply analogously in this instance and will not be repeated so as to avoid redundancy. In order to better distinguish between the first alternative and second alternative, the chambers K1, K2, . . . filled with a fluid F in the second alternative are referred to as "chambers" although they in fact likewise correspond to fluid chambers. Further, the statements made with reference to FIG. 1a, etc. referring to the limiting of the propagation directions of light, which is also shown schematically in FIG. 3 by the light rays which are incident from below, apply analogously in this case.

In the second alternative of the optical element 1, it is preferable that a chamber K1, K2, . . . lies in each instance above an opaque surface O1, O2, . . . in projection direction perpendicular to the substrate S, and the footprint shape of such a chamber K1, K2, . . . approximates the shape of such an opaque surface O1, O2, . . . . Further, it is advantageous when, in the second alternative, electromagnetic switching means are formed, which electromagnetic switching means are formed in a planar manner at one or more sides of the chambers K1, K2, . . . and generate an electromagnetic field acting in the chambers K1, K2, . . . in a switched on state, by means of which the particles P are moved in the fluid so that the position and/or orientation of the particles P are/is switchable between at least two states which produce the aforementioned at least two states of the optical element. The aforementioned electromagnetic switching means are preferably electrodes, and at least the electrodes at the second large surface are (at least partially) transparent. The electrodes at the first large surface are arranged at or near the opaque surfaces O1, O2, . . . or can even correspond to the latter in case of opaque electrodes.

As regards the dimensions of the chambers K1, K2, . . . in the second alternative, reference is made to the configuration variants of the fluid chambers R given above for the first alternative of the optical element. However, particularly the depth of such a chamber K1, K2, . . . can also be greater than 50 µm, for example, 100 µm.

The general remarks respecting the fluid F and the particles P which have been made above with respect to the first alternative are also applicable in an analogous manner to the second alternative, so that it would be redundant to repeat the description. A key difference between the configurations according to the first alternative and according to the second alternative consists in that, in the first alternative, the particles P switch the respective switchable surfaces S1, S2, . . . to be opaque over the surface in one state and to be transparent as possible in the other state, i.e., the particles P are moved more in the horizontal, whereas, in the second alternative, the particles P are moved between the two states more in the vertical in order to achieve or prevent the desired influencing of the light propagation directions through interaction with the opaque surfaces O1, O2, . . . .

In the first state, it is the case for the optical element 1 in the second alternative that at least four fifths, particularly preferably more than nine tenths, of all of the particles P are located in that one third, preferably in that one fourth, of the corresponding chambers K1, K2, . . . that are located closest to the second large surface of the substrate S.

Figure 4:
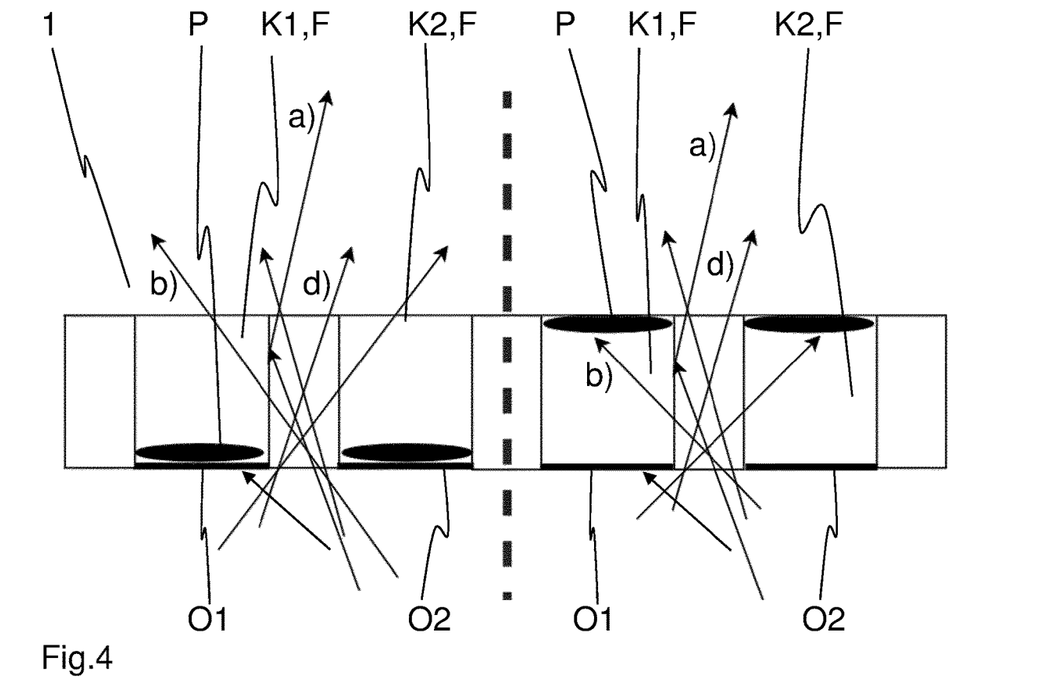
FIG. 4 a schematic diagram of a second configuration of an optical element in the second alternative.

A particularly advantageous configuration of the optical element 1 in the second alternative consists in that the intermediate spaces in the substrate S between respective next-adjacent chambers K1, K2, . . . have a higher refractive index than the fluid F in the chambers K1, K2, . . . at least for a wavelength in the visible range, but preferably for all wavelengths in the range of from 400 nm to 800 nm. This is shown in FIG. 4 as a schematic diagram illustrating a second configuration of an optical element 1 in the second alternative.

In this way, it is brought about that, because of the opaque surfaces O1, O2, . . . , light impinging, for example, on the optical element 1 at the first large surface is incident in the optical element exclusively through the surface portions of the first large surface between the opaque surfaces O1, O2 and, depending on the direction of incidence, polarization and above-mentioned difference in refractive index a) between two chambers K1, K2, . . . , is totally internally reflected at that location and is then coupled out again at the upper surface (in this case, that is, at the second large surface) of the corresponding region of the substrate S (case a), or b) overcomes the refractive index boundary from the substrate material to the fluid F and is incident in the adjoining chamber with fluid F, propagates therein and is finally absorbed at the upper side thereof because of the particles P in the first state or is coupled out in the second state (case b), or c) after overcoming the refractive index boundary from the substrate material to the fluid F, again overcomes the next refractive index boundary from the fluid F to the next-adjacent substrate material and, depending on the then resulting propagation direction and polarization, is coupled out or propagates further in the first optical element until being either coupled out or absorbed depending on the state of the optical element (case c), or d) in both states, traverses the substrate S between two chambers K1, K2 without total internal reflection and is coupled out of the optical element again at the second large surface (case d). All of the cases a) to d) need not expressly occur in a physical implementation of the invention. For example, it is possible that cases c) do not occur as is shown here in FIG. 4 in which selected rays for cases a), b) and d) are shown. This description applies in an analogous manner for the case where light impinges on the optical element 1 via the second large surface because the light path is reversible.

The aforementioned difference in the refractive index having the effect described above can also be applied in principle for the first alternative of the optical element which has been explained in three exemplary configurations referring to the diagrams in FIGS. 1a, 1b and 2: that is, instead of chambers K1, K2, . . . , of the second alternative, those volume regions of the substrate S in the first alternative located in each instance between an opaque surface O1, . . . and the respective closest switchable surface S1, . . . would have a lower refractive index than the volume regions of the substrate S surrounding them. Accordingly, cases a) to d) or selections thereof can also be produced in principle.

The advantage of this second configuration of the second alternative consists in that the light which is limited in the first state with respect to its propagation directions through the optical element 1 approximately has a top hat distribution, i.e., the luminance has only a slight angle dependence around the preferred propagation direction after which there is a steep drop in transmission. The transmission dependence described above has the advantage that a viewer perceives the transmission homogeneously from a preferential direction and the transmission is sharply reduced for viewers from angles of, e.g., more than 30° (this angle may also be varied, e.g., 10°, 20°, 25°, 40° or) 45°.

Advantageous configurations are further generated in such a way that every opaque surface O1, O2, . . . is formed by a permanent absorber layer and/or by at least one downwardly reflecting layer. If there is only one reflective layer, which is possible within the scope of the invention, it goes without saying that this reflective layer likewise has opaque characteristics. The reflective characteristics contribute to increased efficiency, for example, when an optical element 1 is installed in an illumination device, such as for an LCD panel.

In both alternatives of the optical element, it is possible that the substrate S forms the cover substrate of an OLED, microLED or LCD panel which each possesses pixels or subpixels. Alternatively, the substrate S can be applied to or positioned in front of the above-mentioned cover substrate.

Advantageously, it is the case for the first alternative that the center of each region is situated in each instance between switchable surfaces S1, S2, . . . and/or opaque surfaces O1, O2, . . . with a tolerance of at most 20% of the width of such a region in front of the center point of an aforementioned pixel or subpixel of the respective panel in perpendicular projection on the substrate S.

Alternatively, however, it is also possible that the center of each region is situated between switchable surfaces S1, S2, . . . and/or opaque surfaces O1, O2, . . . so as to be slightly offset in each instance in front of the center point of an aforementioned pixel or subpixel of the respective panel in perpendicular projection on the substrate S such that the imaginary connecting lines connecting the respective centers of the switchable surfaces S1, S2, . . . with those of opaque surfaces O1, O2, . . . point towards a viewer B with a tolerance of at most 15° (at least with respect to a plane, for example, a plane perpendicular to the second large surface of the substrate S which notionally intersects both eyes of the viewer B). Accordingly, the light transmitted in the first state of the optical element 1 would be focused on a viewer B. This is shown in a highly schematic manner in FIG. 5. For a suitable dimensioning, the intercept theorem must be applied correspondingly in this case. It goes without saying that, in reality, a large number of opaque surfaces O1, O2, . . . and switchable surfaces S1, S2, . . . are used and not just six opaque surfaces O1, O2, . . . and six switchable surfaces S1, S2, . . . .

Figure 6:
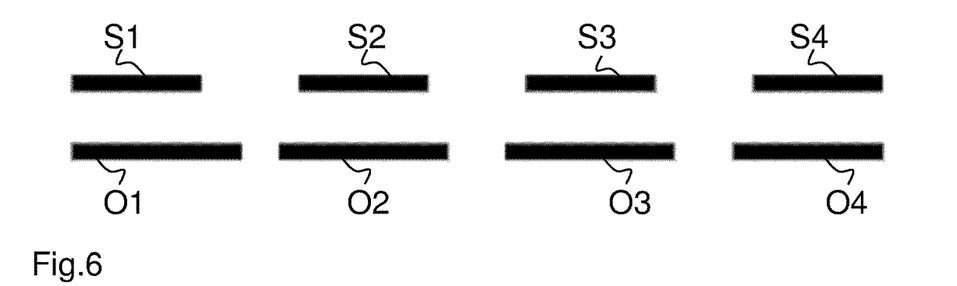
FIG. 6 a schematic diagram illustrating a first variation of the surface sizes of the switchable surfaces relative to the opaque surfaces in the first alternative of an optical element.
Figure 7:
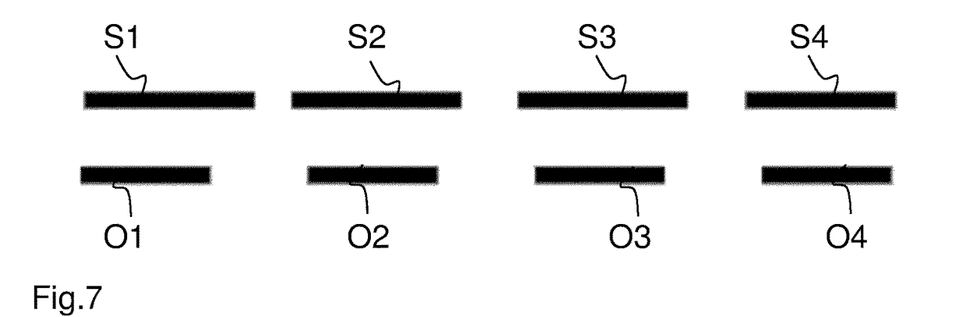
FIG. 7 a schematic diagram illustrating a second variation of the surface sizes of the switchable surfaces relative to the opaque surfaces in the first alternative of an optical element.

Variations in the sizes of the switchable surfaces S1, S2, . . . (see FIG. 6) and/or of the opaque surfaces O1, O2, . . . (See FIG. 7) are also possible in order to further influence the transmission characteristics of the optical element 1.

Figure 8:
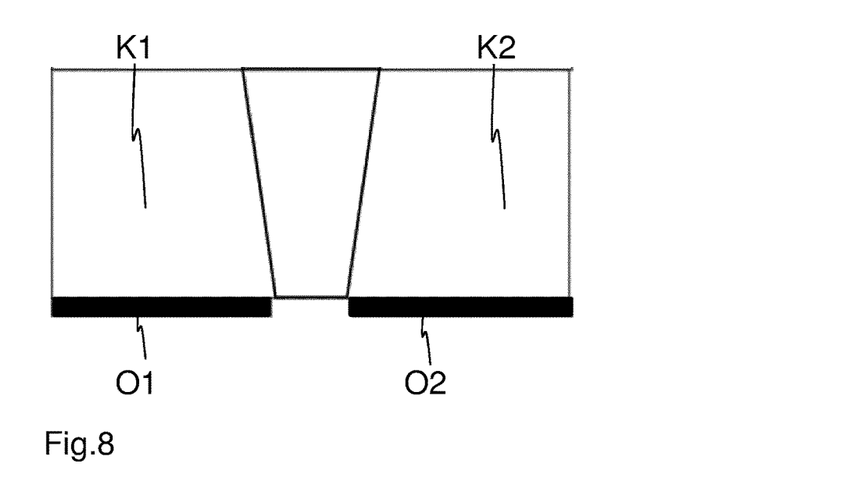
FIG. 8 a schematic diagram illustrating a variation of the surface sizes of upper surfaces of the chambers relative to the opaque surfaces in the second alternative of an optical element.

In this sense, in the second alternative, for example, the upper surfaces of the chambers K1, K2, . . . may be smaller than the lower (base) surfaces of the chambers K1, K2, . . . which generally correspond to or are congruent with the opaque surfaces O1, O2, . . . . Accordingly, the transmission is again focused toward the viewer B. This is shown in a highly schematic manner in FIG. 8.

Figure 9:
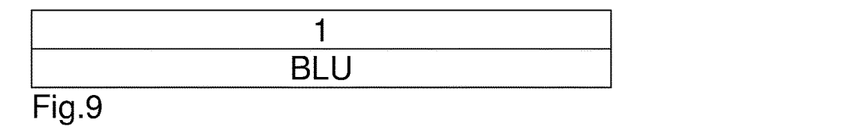
FIG. 9 a schematic diagram of an illumination device for a display screen with an optical element.

Further, FIG. 9 shows a schematic diagram illustrating an illumination device for a display screen which can be operated for a restricted viewing mode in a first state and for a public viewing mode in a second state, with an optical element 1. This illumination device comprises a two-dimensionally extensive backlight BLU which emits light in an unrestricted angular range and an optical element 1 situated in front of the backlight BLU in viewing direction as has been described.

The backlight BLU used herein preferably emits light in an unrestricted angular range. However, it is also possible that the backlight BLU has a certain pre-focus, for example, in that it emits no more than 10% or 20% of the peak brightness horizontally in a (horizontally measured) angular range over 30° or 45°.

Such an illumination device is advantageously used with a transmissive image rendering unit (e.g., an LCD panel) arranged in front of the optical element 1 in viewing direction in order to obtain a display screen which can be operated for a restricted viewing mode in a first state and for a private viewing mode in a second state because, due to the optical element 1, the light of the illumination device BLU is limited with respect to propagation directions, that is, therefore, focused (first state) in one case and not focused (second state) in the other case.

Figure 10:
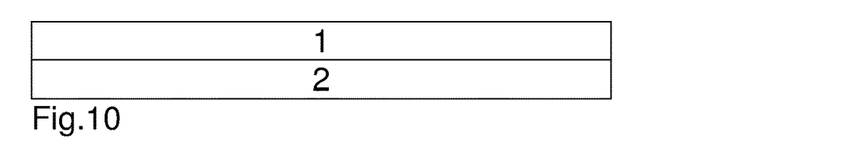
FIG. 10 a schematic diagram of a display screen which can be operated in a first state for a restricted viewing mode and in a second state for a public viewing mode, with an optical element.

Lastly, FIG. 10 shows a schematic diagram of a display screen which can be operated in a first state for a restricted viewing mode and in a second state for a public viewing mode, with an optical element 1. Such a display screen comprises an optical element 1 as described above and an image rendering unit 2 arranged upstream or downstream of the optical element 1 from the viewpoint of a viewer (FIG. 10 shows the variant in which the image rendering unit 2 is arranged downstream).

The image rendering unit 2 is, for example, an OLED display, an LCD panel, an SED panel, an FED panel, a microLED display or a VFD. Since the optical element 1 is operative regardless of the type of image rendering unit 2, any other type of image rendering unit is likewise contemplated.

A restricted viewing mode is provided for the aforementioned display screen in the first state of the optical element 1, and a public viewing mode for the aforementioned display screen is provided in the second state of the optical element 1.

Means for reducing or controlling reflection, for example, an antiglare coating and/or antireflection coating, may be arranged on the surface of the image rendering unit 2.

The above-stated objects are met by the above-described optical element and the described illumination device and the display screen which can be implemented therewith. The description was of an optical element which can influence the transmission in an angle-dependent manner and which can switch between at least two states. The optical element is realizable at a low cost and is universally usable, particularly with various types of display screen, to enable switching between a private viewing mode and a public viewing mode. Further, display screens and illumination devices for display screens based on the optical element were described.

The above-described invention can advantageously be applied anywhere that confidential data are displayed and/or entered, such as pin number entry or data display in money dispensing machines or payment terminals or for entering passwords or when reading e-mails on mobile devices. The invention can also be applied in passenger vehicles, as has been described above.

REFERENCE CHARACTERS 1 optical element
2 image rendering unit
5 BLU backlight
F fluid
K1, K2, . . . chamber
O1, O2, . . . opaque surface
P particle
R fluid chamber
S substrate
S1, S2, . . . switchable surface

The invention claimed is:

1. An optical element comprising
a substantially plate-shaped or shell-shaped substrate with a first large surface and a second large surface, wherein one of the large surfaces acts as light entry surface for light incident on the optical element and the other large surface acts as light exit surface for light incident on the optical element,
a plurality of opaque surfaces near or on the first large surface,
in a first alternative, a plurality of surfaces near or on the second large surface which are switchable between an opaque state and a transparent state or, in a second alternative, a plurality of chambers in the substrate which are filled with a fluid, wherein the fluid contains up to 30 volume percent of electrophoretically or magnetophoretically movable particles which absorb light of one or more wavelengths or wavelength ranges and which can be localized in at least two different states inside of the respective chambers by a variable electromagnetic field,
 wherein, in the first alternative, a switchable surface lies in each instance above an opaque surface in a projection direction perpendicular to the substrate, and wherein, in the second alternative, a chamber lies in each instance above an opaque surface in a projection direction perpendicular to the substrate,
so that, in a first state in which, in the first alternative, the switchable surfaces are in the opaque state and in which, in the second alternative, more than one half of all of the particles are located in that one half of the corresponding chambers that is remote of the first large surface, the optical element limits the propagation directions of light which impinges on the light entry surface,
and so that, in a second state in which, in the first alternative, the switchable surfaces are in the transparent state and in which, in the second alternative, more than one half of all of the particles are located in that one half of the corresponding chambers that faces the first large surface, the optical element does not limit the propagation directions of light impinging on the light entry surface but, rather, merely does not transmit a portion of the light because of the opaque surfaces.

2. The optical element according to claim 1, wherein, in the first alternative, the switchable surfaces contain at least one electrochromic layer, an LC cell, and/or an LC film with dichroic dyes.

3. The optical element according to claim 1, wherein, in the first alternative, the switchable surfaces comprise fluid chambers which contain a fluid, wherein the fluid contains up to 30 volume percent of electrophoretically or magnetophoretically movable particles which absorb light of one or more wavelengths or wavelength ranges, wherein, further, electromagnetic switching means are formed, which electromagnetic switching means are formed in a planar manner at one or more sides of the fluid chambers and generate an electromagnetic field acting in the fluid chambers in a switched on condition, by means of which the particles are moved in the fluid such that the position and/or orientation of the particles are/is switchable between at least two states which produce the aforementioned opaque and transparent states of the switchable surfaces.

4. The optical element according to claim 1, wherein, in the first alternative, the switchable surfaces are divided into at least two groups which are switchable independently from one another in each instance such that a local switchability between the first state and the second state is made possible.

5. The optical element in the first alternative according to claim 1, further comprising means for suppressing light rays propagating in the substrate which either penetrate into the substrate from an intermediate space between two adjacent opaque surfaces or, in the opaque transparent state of the switchable surfaces, from an intermediate space between two adjacent switchable surfaces and are directed to the respective intermediate spaces which are not the next-adjacent intermediate spaces between correspondingly switchable surfaces or opaque surfaces on the respective opposite large surface of the substrate.

6. The optical element according to claim 1 in both alternatives, wherein the substrate forms the cover substrate of an OLED, microLED or LCD panel which each possesses pixels or subpixels.

7. The optical element according to claim 6, wherein, in the first alternative, the center of each region is situated in each instance between switchable surfaces and/or opaque surfaces in front of the center point of an aforementioned pixel or subpixel of the respective panel in perpendicular projection on the substrate with a tolerance of at most 20% of the width of such a region.

8. The optical element according to claim 1, wherein, in both alternatives, the opaque surfaces are arranged behind the substrate in a viewing direction of a viewer at or near the large surface and are reflective or partially reflective at the side remote of a viewer.

9. The optical element according to claim 1, wherein, in the second alternative, electromagnetic switching means are formed, which electromagnetic switching means are formed in a planar manner at one or more sides of the chambers and generate an electromagnetic field acting in the chambers in a switched on condition, by means of which the particles are moved in the fluid such that the position and/or orientation of the particles are/is switchable between at least two states which produce the aforementioned at least two states of the optical element.

10. The optical element according to claim 1, wherein, in the second alternative in the first state, at least four fifths of all of the particles are located in that one third of the corresponding chambers that are located closest to the second large surface of the substrate.

11. The optical element according to claim 1, wherein, in the second alternative, the intermediate spaces between respective next-adjacent chambers have a higher refractive index than the fluid, wherein this applies at least for a wavelength in the visible range.

12. An illumination device for a display screen which can be operated for a restricted viewing mode in a first state and for a public viewing mode in a second state, comprising:
   a two-dimensionally extensive backlight which emits light in an unrestricted angular range, and
   the optical element according to claim 1, the optical element situated in front of the backlight in a viewing direction.

13. A display screen which can be operated in a first state for a restricted viewing mode and in a second state for a public viewing mode, comprising:
   the optical element according to claim 1, and
   an image rendering unit arranged upstream or downstream of the optical element from a viewpoint of a viewer.

14. The optical element according to claim 9, wherein, in the second alternative in the first state, at least four fifths of all of the particles are located in that one third of the corresponding chambers that are located closest to the second large surface of the substrate.

15. The optical element according to claim 1, wherein, in the second alternative, the intermediate spaces between respective next-adjacent chambers have a higher refractive index than the fluid, wherein this applies at least for all wavelengths in a range from 400 nm to 800 nm.

16. The optical element according to claim 6, wherein, in the second alternative, the intermediate spaces between respective next-adjacent chambers have a higher refractive index than the fluid, wherein this applies at least for a wavelength in the visible range.

17. The optical element according to claim 8, wherein, in the second alternative, the intermediate spaces between respective next-adjacent chambers have a higher refractive index than the fluid, wherein this applies at least for a wavelength in the visible range.

18. The optical element according to claim 9, wherein, in the second alternative, the intermediate spaces between respective next-adjacent chambers have a higher refractive index than the fluid, wherein this applies at least for a wavelength in the visible range.

19. The optical element according to claim 10, wherein, in the second alternative, the intermediate spaces between respective next-adjacent chambers have a higher refractive index than the fluid, wherein this applies at least for a wavelength in the visible range.

* * * * *

UNITED STATES PATENT AND TRADEMARK OFFICE
CERTIFICATE OF CORRECTION

PATENT NO. : 12,111,523 B1
APPLICATION NO. : 18/293853
DATED : October 8, 2024
INVENTOR(S) : Andreas Bregulla et al.

Page 1 of 1

It is certified that error appears in the above-identified patent and that said Letters Patent is hereby corrected as shown below:

In the Specification

In Column 3, Line 53, delete "or) 45°" and insert -- or 45°) --, therefor.

In Column 8, Line 63, delete "or) 45°." and insert -- or 45°). --, therefor.

In Column 12, Line 63, delete "or) 45°" and insert -- or 45°) --, therefor.

In Column 17, Line 31, delete "or) 45. °" and insert -- or 45°). --, therefor.

In Column 19, Line 22, delete "5 BLU" and insert -- BLU--, therefor.

Signed and Sealed this
Twenty-fourth Day of December, 2024

Derrick Brent
*Acting Director of the United States Patent and Trademark Office*